United States Patent [19]

Wu

[11] Patent Number: 4,882,920
[45] Date of Patent: Nov. 28, 1989

[54] STEERING LOCK FOR AUTOMOBILE

[76] Inventor: Jinn-Fu Wu, No. 127, Hai Huan Street, Tainan, Taiwan

[21] Appl. No.: 341,157

[22] Filed: Apr. 21, 1989

[51] Int. Cl.$^4$ .............................................. B60R 25/02
[52] U.S. Cl. ........................................ 70/209; 70/226
[58] Field of Search .......................... 70/237, 209–212, 70/225–227, 218

[56] References Cited

U.S. PATENT DOCUMENTS

| 1,307,161 | 6/1919 | Stubblefield | 70/226 |
| 4,103,524 | 8/1978 | Mitchell et al. | 70/237 X |
| 4,823,573 | 4/1989 | Latta | 70/226 X |

FOREIGN PATENT DOCUMENTS

| 804404 | 4/1951 | Fed. Rep. of Germany | 70/212 |
| 2566348 | 12/1985 | France | 70/237 |
| 1007711 | 10/1965 | United Kingdom | 70/237 |
| 1385073 | 2/1975 | United Kingdom | 70/237 |

Primary Examiner—Lloyd A. Gall
Attorney, Agent, or Firm—Morton J. Rosenberg; David I. Klein

[57] ABSTRACT

This invention relates to a steering lock for an automobile. In particular, one utilizing a U-shaped hook to clip a steering wheel and insert with a latch rod into the U-shaped hook so as to lock the steering wheel to protect the automobile from being stolen.

1 Claim, 7 Drawing Sheets

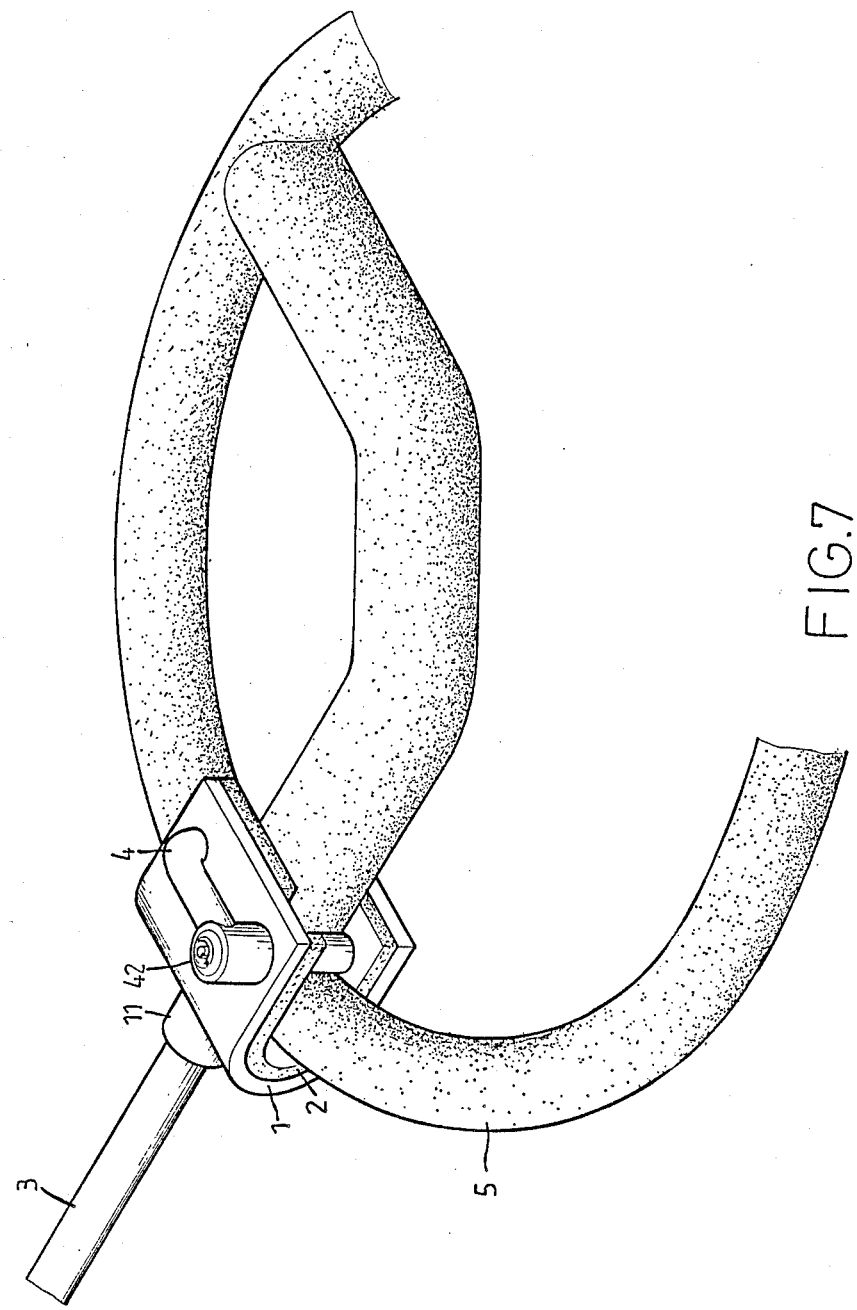

STEERING LOCK FOR AUTOMOBILE

BACKGROUND OF THE INVENTION

Many steering locks for automobiles have being developed to protect automobiles from being stolen. However, privious inventions do exist some defects. For instance: (1) Traditional steering locks may easily be forced to open by a lever bar. (2) Traditional locks must have two hooks in order to lock a steering wheel and these locks do not correspond to the cost effective principle. (3) In order to fit all models, the latch rod has to be made longer so as to limit illegal control the steering wheel. However, the longer the latch rod is, the more inconvenient it will be.

The inventor, in view of this, has invented this invention which utilizes one hook extended with an outer tubular member engaged with a latch rod to effectively protect the automobile from being stolen.

SUMMARY OF THE INVENTION

This invention relates to a steering lock for an automobile.

It is the primary object of the present invention to provide a steering lock for an automobile which utilizes a distance adjustable latch rod so as to operate this invention easily.

It is another object of the present invention to provide a steering lock for an automobile which increases the safety.

It is another object of the present invention to provide a steering lock for an automobile which is inexpensive to produce.

BRIEF DESCRIPTION OF THE DRAWINGS

FIG. 7 is another perspective view of the present invention.

DETAILED DESCRIPTION OF THE PREFERRED EMBODIMENT

Figure 1:
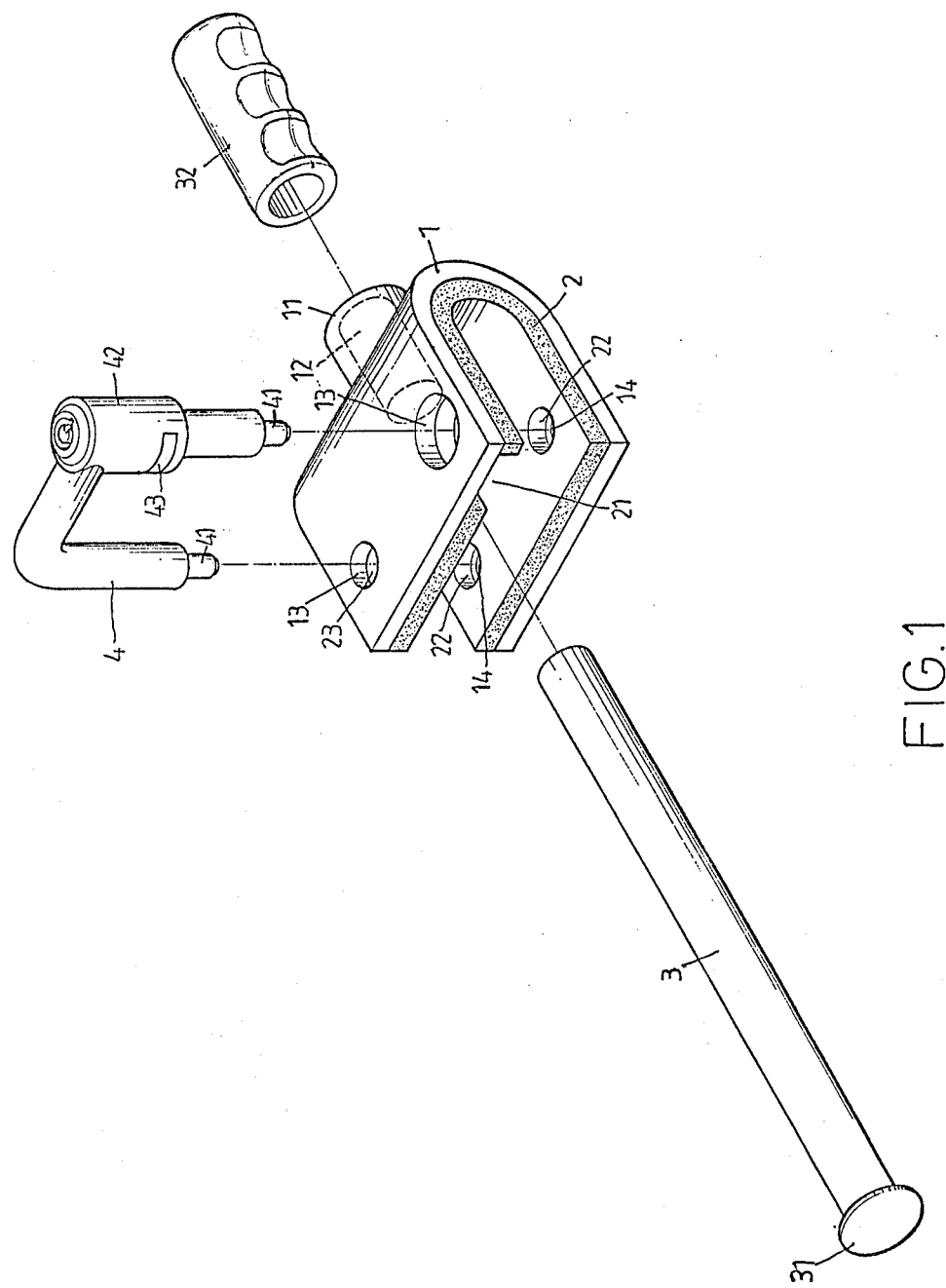
FIG. 1 is an exploded view of the present invention.
Figure 2:
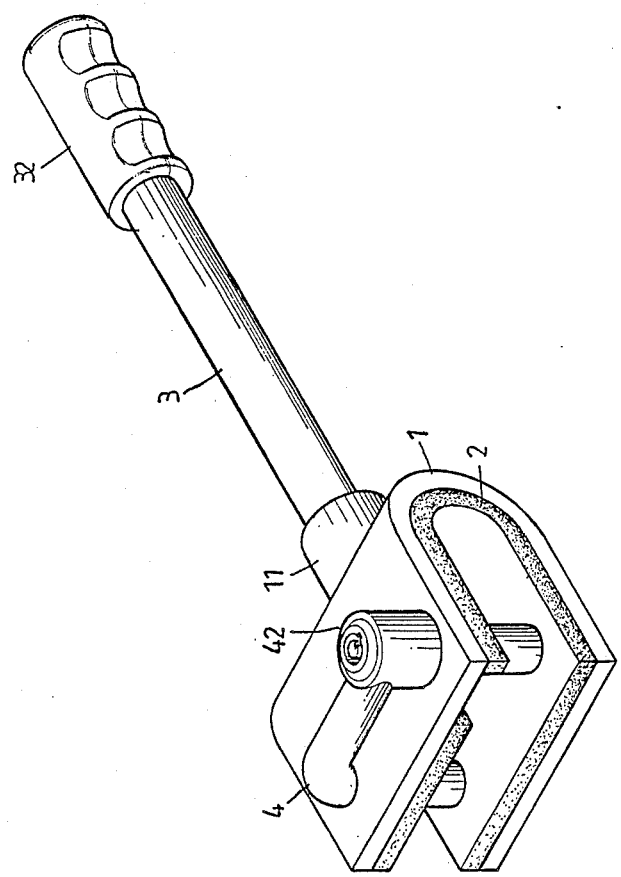
FIG. 2 is a perspective view of the present invention.
Figure 6:
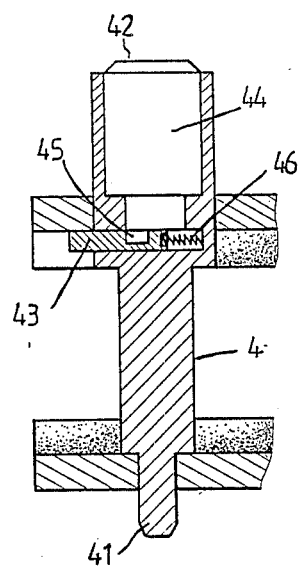
FIG. 6 is a sectional view of the present invention.

With reference to the drawings and in particular to FIG. 1 thereof, the steering lock for an automobile according to the present invention comprises a U-shaped hook 1 which is formed with an outer tubular member 11, two holes 13 and two aligned holes 14, a pad 2 having also two aligned holes 22, a hole 23, and a U-shaped cutting portion 21, a latch rod 3 having a stop shoulder 31, a handgrip 32 and a engaging member 4 having two actuating members 41, a lock core 42 and a slot and lock bolt 43. The outer tubular member 11 has a longitudinal hole 12 to accept and fix the latch rod 3 and the stop shoulder 31 is blocked from extension into the outer tubular member 11. It should be noted, however, that the principle and function of the slot and lock bolt 43, the actuating member 41 and the lock core 42 (shown as FIG. 6) are well known in the art and need not to be described hereinafter in detail.

Figure 3:
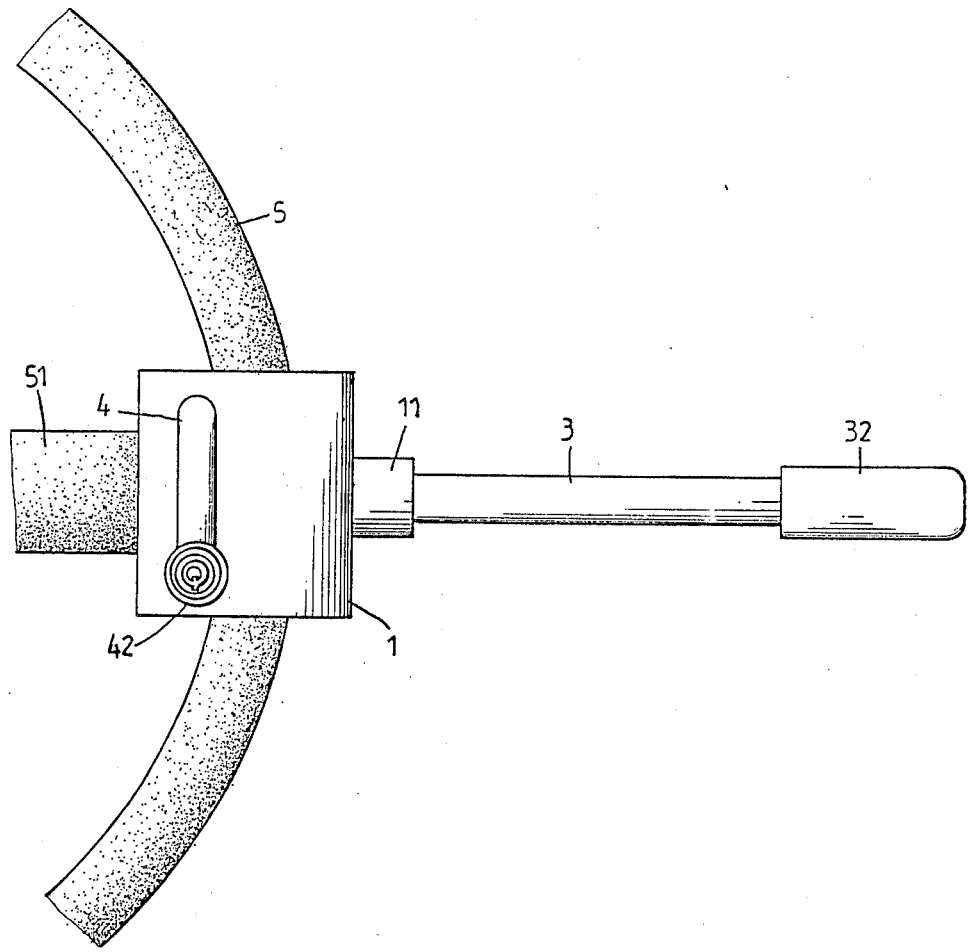
FIG. 3 is top perspective view of the present invention.
Figure 4:
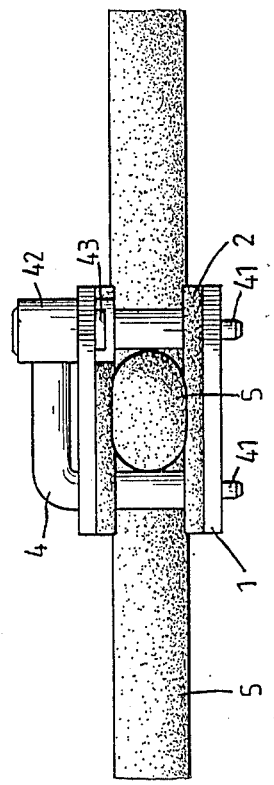
FIG. 4 is a front perspective view of the present invention.

Reference is now made to the FIG. 3, a top perspective view of the present invention. Firstly push the U-shaped hook into a steering wheel 5 with the inner surface close to the outer tubular member 11 against the steering 5 and the two holes 13 placed at two sides of a rib 51 of the steering wheel 5 thus when placing the engaging member 4 into the holes 13 of the U-shaped hook 1, the rib 51 of the steering wheel 5 will be clamped by the engaging member 4 thus the steering wheel 5 is locked (shown as in FIGS. 4 and 7). When people desire to release the present invention from the steering wheel, it is only necessary to unlock the lock core 42 with a legal key and draw out the engaging member 4 from the U-shaped hook 1.

Figure 5:
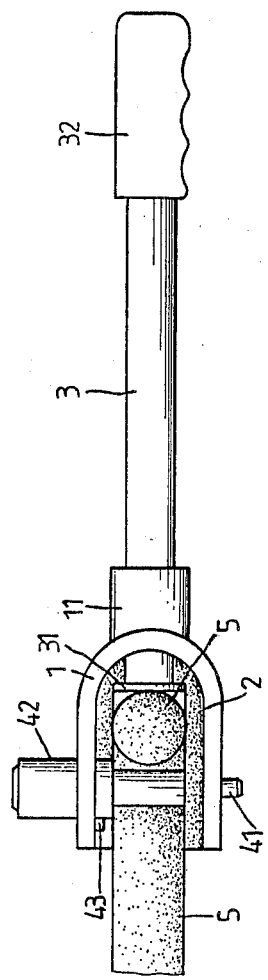
FIG. 5 is a side perspective view of the present invention.

FIG. 5 shows the stop shoulder 31 of the latch rod 3 is placed against the steering wheel 5 and the engaging member 4 clamps the rib 51 of the steering wheel 5 and limits the movement of the steering wheel 5.

I claim:
1. A steering lock for an automobile comprising:
   a U-shaped hook having an outer tubular member at one end, two holes at one side and two aligned holes at the other side;
   a latch rod having a stop shoulder at one side and a handgrip at another end, said stop shoulder being placed between said sides and adjacent said outer tubular member of said U-shaped hook;
   an engaging member having two actuating members, a lock core, a lock bolt and a slot; wherein, said engaging members being designed to clamp a rib of a steering wheel while said stop shoulder of said latch rod is abutted against a steering wheel.

* * * * *